(12) United States Patent
Gostu et al.

(10) Patent No.: US 10,836,649 B2
(45) Date of Patent: Nov. 17, 2020

(54) MAGNETITE PRODUCTION FROM BAUXITE RESIDUE

(71) Applicant: Worcester Polytechnic Institute, Worcester, MA (US)

(72) Inventors: Sumedh Gostu, Telangana (IN); Brajendra Mishra, Worcester, MA (US)

(73) Assignee: Worcester Polytechnic Institute, Worcester, MA (US)

(*) Notice: Subject to any disclaimer, the term of this patent is extended or adjusted under 35 U.S.C. 154(b) by 0 days.

(21) Appl. No.: 16/213,243

(22) Filed: Dec. 7, 2018

(65) Prior Publication Data

US 2019/0177178 A1  Jun. 13, 2019

Related U.S. Application Data

(60) Provisional application No. 62/596,160, filed on Dec. 8, 2017.

(51) Int. Cl.
```
C01G 49/08    (2006.01)
C07F 15/02    (2006.01)
C22B 3/16     (2006.01)
```
(52) U.S. Cl.
CPC .......... *C01G 49/08* (2013.01); *C07F 15/025* (2013.01); *C22B 3/16* (2013.01)

(58) Field of Classification Search
None
See application file for complete search history.

(56) References Cited

U.S. PATENT DOCUMENTS

2017/0320751 A1  11/2017  Amiran

FOREIGN PATENT DOCUMENTS

| CN | 103922416 A | 7/2014 |
| DE | 102006020840 A1 | 11/2007 |
| JP | 57149830 A * | 9/1982 |
| WO | WO 2017163094 A1 | 9/2017 |

OTHER PUBLICATIONS

Mishra B., et al, "Recovery of value-added products from red mud", Minerals & Metal-Lurgical Processing, 2002, pp. 8.
Bonomi C., et al, Review of Technologies in the Recovery of Iron, Aluminium, Titanium and Rare Earth Elements from Bauxite Residue (Red Mud), 3rd International Symposium on En-hanced Landfill Mining, 2016, pp. 18.

(Continued)

*Primary Examiner* — Melissa S Swain
(74) *Attorney, Agent, or Firm* — Armis IP Law, LLC

(57) ABSTRACT

A low-temperature leaching operation employs a raw, red mud slurry directly from aluminum production for an oxalic acid leaching of ferric oxalate. Residual calcium, titanium, aluminum and other rare earths are also recoverable in a secondary stream. Monitoring and control of the pH of the leach solution yields soluble ferric oxalate without high temperatures or specific radiation or light sources. Addition of iron powder results in precipitation of ferrous oxalate, isolated by magnetic separation from the iron powder which recirculates in the solution. Magnetite may then be produced by heating the ferrous oxalate in low $pO_2$ conditions.

14 Claims, 3 Drawing Sheets

(56) References Cited

OTHER PUBLICATIONS

Angermann A., et al, "Synthesis of magnetite nanoparticles by thermal decomposition of fer-rous oxalate dihydrate", J. Mater, Sci, 2008, pp. 8.
Yang, Y., et al. "Recovery of iron from red mud by selective leach with oxalic acid", Hydrometal-lurgy, 2015, pp. 6.
International Search Report, PCT/US2018/064477, dated Mar. 7, 2019, pp. 2.

* cited by examiner

MAGNETITE PRODUCTION FROM BAUXITE RESIDUE

RELATED APPLICATIONS

This application claims the benefit under 35 U.S.C. § 119(e) of U.S. Provisional Patent Application No. 62/596,160, filed Dec. 8, 2017, entitled "MAGNETITE PRODUCTION" incorporated herein by reference in entirety.

STATEMENT REGARDING FEDERALLY SPONSORED RESEARCH AND DEVELOPMENT

This invention was developed in whole or in part with funding under grant No. NSF 1464542, awarded by the National Science Foundation.

BACKGROUND

Processing of bauxite employed for production of alumina yields a residual red mud. The worldwide annual rate of red mud generation is approximately 120 million tons, and most of this is stockpiled. Red mud is rich in elements like aluminum, titanium and rare-earths, in addition to the major iron-bearing constituents.

SUMMARY

A low-temperature leaching operation employs a raw, red mud slurry taken directly from aluminum production for oxalic acid leaching of ferric oxalate. Residual calcium, titanium, aluminum and other rare earths are also recoverable in a secondary stream. Monitoring and control of the pH of the leach solution yields soluble ferric oxalate without high temperatures or specific radiation or light sources. Addition of iron powder results in precipitation of ferrous oxalate, isolated by magnetic separation from the iron powder which recirculates in the solution. Magnetite may then be produced by heating the ferrous oxalate in low $pO_2$ conditions.

Configurations herein are based, in part, on the observation that conventional approaches to red mud by-products of aluminum production typically discard the red mud (Bauxite Residue, or BR) as a waste product. BR typically contains a small but significant quantity of Iron, Aluminum, Titanium, Calcium and other rare earths amenable to refinement and harvesting. Unfortunately, conventional approaches to BR processing suffer from the shortcoming that high temperatures and specialized light sources are required, limiting cost effectiveness of BR recycling. The BR must also be transported from an aluminum refining facility to a secondary plant for processing, further mitigating cost advantages of recycling. Configurations herein substantially overcome the shortcomings of conventional BR usage by providing a low temperature leaching and precipitation process for ferric oxalate, a precursor to magnetite. The low temperature process receives hydrated red mud slurry directly from an aluminum plant. PH monitoring, rather than high temperature or radiation, support the precipitation of ferrous oxalate from the ferric oxalate in the leach solution, and the hydrometallurgical processing of red mud slurry avoids the need for drying or high temperatures associated with conventional pyrometallurgic processing of BR.

In further detail, configurations herein employ a hydrothermal extraction process for red mud to obtain selectivity between various metallic constituents and produce valuable by-products, including fine particulate magnetite, titanium, aluminum and rare earth components. The method for extracting ferrous oxalate from red mud includes adding oxalic acid to raw red mud to form a leach solution, and monitoring and controlling the pH of the leach solution to maintain the pH between 1.5-3.0. Following leaching, iron powder is added to the leach solution for combining with ferric oxalate in the leach solution. Ferrous oxalate is precipitated from the leach solution, the iron powder is separated from the ferrous oxalate via magnetic separation, and the iron powder returned to continue precipitation of ferrous oxalate.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is example of a red mud processing apparatus for receiving red mud directly on-site with an aluminum refining facility. The disclosed apparatus is scalable and adapted to receive and use red mud slurry directly, without any drying. An oxalic acid solution may be adjusted to accommodate any hydration shortcomings and achieve an appropriate solution ratio with the red mud. As the process is hydrometallurgical, rather than pyrometallurgical, the ferrous oxalate is generated by varying the pH at relatively low temperatures. In conventional approaches to BR processing, refinement and recycling, high temperatures and radiation are often employed, resulting in substantial CO and $CO_2$ generation. Other approaches employ strong acids without regard to pH monitoring and control.

Conventional approaches to red mud recycling include usage of iron scraps for raw material input. Strong acids without regard to pH monitoring or control are required to accommodate the large iron pieces. Other approaches employ UV or IR radiation, rather than pH manipulation, and sources with a greater carbon composition. Wet magnetic separation may also be employed. Different forms of iron oxalate (such as iron (III) oxalate) may result.

U.S. Publication No. 20170320751 (Amiran) teaches magnetite production using a pyrometallurgical reduction procedure with coke and later modified with a mixture of $CO/CO_2$ at 1100° C.

WIPO publication No. Application WO/2017/163094 teaches a process where pyrometallurgical reduction of hematite in red mud to magnetite wherein an aluminum and titanium suspension was achieved after washing with hydrochloric acid.

Figure 1:
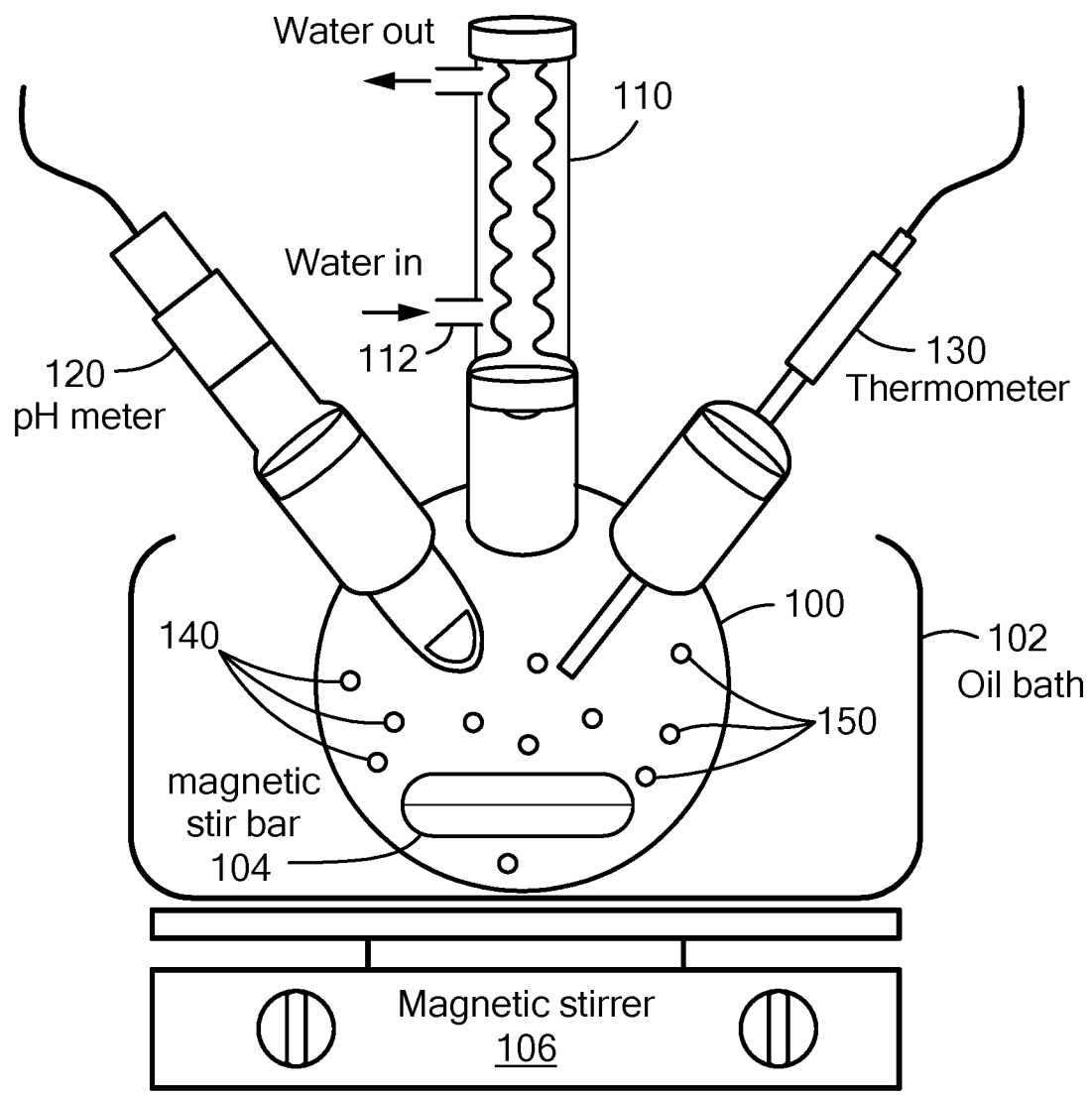
FIG. 1 is a context diagram of a containment apparatus suitable for use with configurations herein.

FIG. 1 is a context diagram of a containment apparatus suitable for use with configurations herein. The disclosed process may be performed as a closed system or as a stream of red mud and leachate, however the containment apparatus is beneficial for illustrating the principles of the disclosed approach.

Leaching experiments were carried out using a three necked flat bottomed flask as a containment apparatus 100. A condensation distillation column 110 connected through one end was continuously supplied 112 with cold distilled water. A pH meter 120 and a thermocouple 130 (thermometer) were inserted through the other accesses. The containment apparatus 100 is assisted with a silicone oil bath 102 for better temperature control.

A magnetic stir bar 104 assists in magnetic separation of iron particles 140 and ferrous oxalate 150, discussed further below. The use of a magnetic stirrer 106 or other magnetic separation, in conjunction with iron particles for combining with ferric oxalate, provides selectivity and purity of the resulting ferrous oxalate 150. Responsive to the pH meter 120, maintaining the pH results in formation of insoluble ferrous oxalate from soluble ferric oxalate in the leach solution, and is performed at a temperature around 90-95° C.

The low temperature, pH monitored approach allows for co-locating a containment apparatus for the red mud and precipitated ferrous oxalate with an aluminum refining operation for receiving the raw red mud from the co-located aluminum refinement. In contrast to conventional approaches, this avoids the need to transport the red mud to a furnace or similar facility for heating, and allows for performance of precipitation in ambient visible light and an absence of UV lighting. Red mud may be taken directly in a slurry form from the aluminum processing and fed into the containment apparatus.

Figure 2:
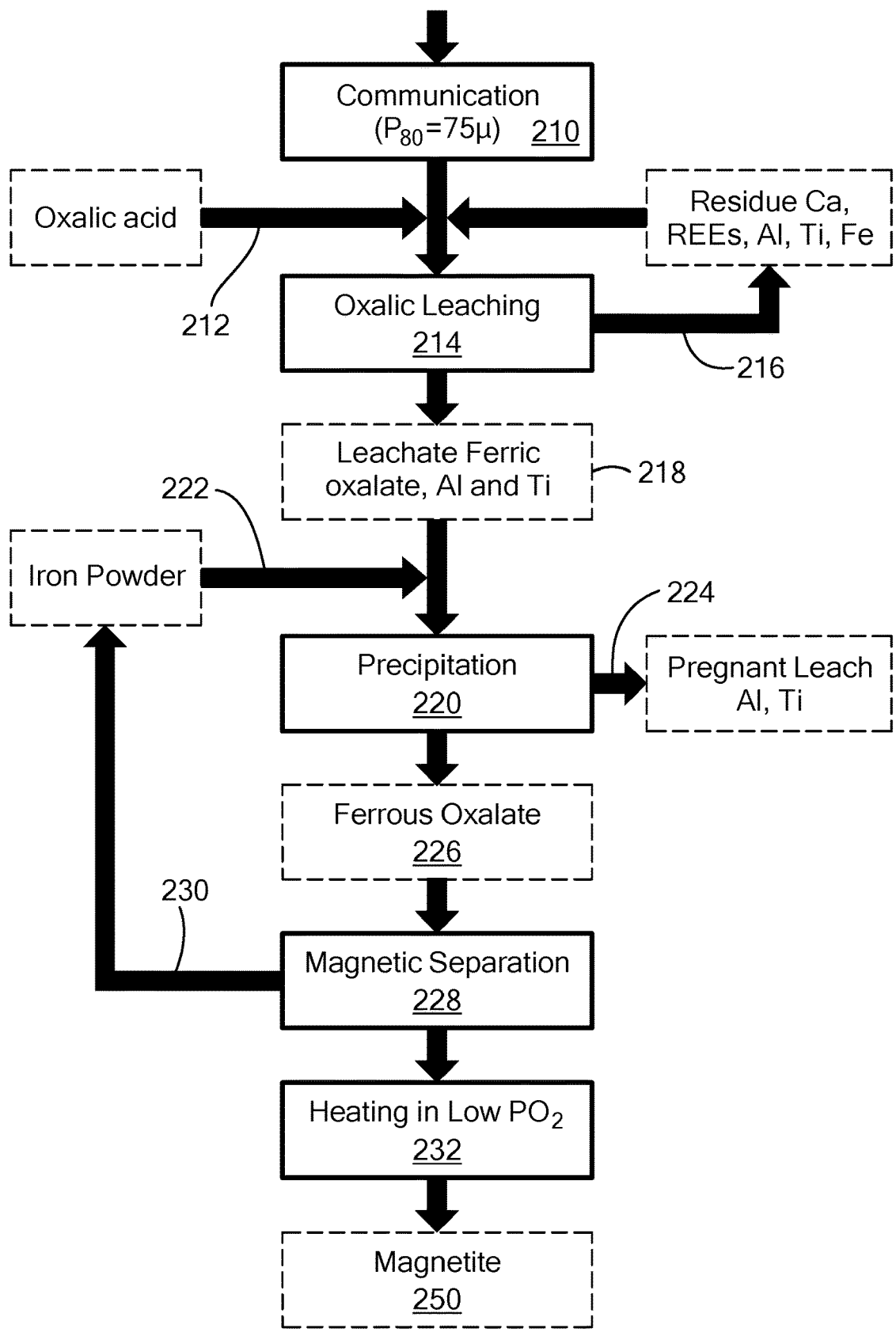
FIG. 2 is a flowchart of magnetite production from red mud using the containment apparatus of FIG. 1.

FIG. 2 is a flowchart of magnetite production from red mud using the containment apparatus of FIG. 1. FIG. 2 shows a general, scalable approach to the example containment apparatus of FIG. 1. Referring to FIGS. 1 and 2, at step 210, red mud is received in a slurry form from an aluminum refinery. An example arrangement employs comminuted Jamaican red mud grinded to a $P_{80}$ of 75 microns. Alternatively, raw red mud in a hydrated slurry resulting from a waste stream in aluminum refinement is received, and this red mud slurry can be input directly at step 210 since the approach is hydrometallurgical process, and no drying is required before processing. Any intended hydration may be compensated in the leach step below.

Oxalic acid 212 is added at step 214 for oxalic acid leaching. Hematite present in red mud, Alumina, and Titania are selectively leached and converted to soluble Ferric oxalate, aluminium oxalate and titanium oxalate respectively. Calcium and other rare earth salts present in red mud form insoluble oxalates and separate as the residue 216.

During the leaching, feedback from pH meter 120 is employed for maintaining the pH of the leach solution in a range between 1.5-3.0. In some configurations, this includes monitoring and controlling the pH of the leach solution to a range between 2.0-2.5. Hydrochloric acid may be added for reducing the pH of the leach solution to the desired range. The temperature of the leach solution is maintained between 80-100° C., typically around 90° C., while leaching ferric oxalate. Some configurations will benefit from maintaining the temperature of the leach solution between 90-95° C. during leaching of the ferric oxalate.

In the example of FIG. 1, the parameters used for leaching include temperature=95° C., oxalic acid concentration of 2.5 M, time of reaction=2.5 h, pulp density=15% (g of red mud per 100 ml solution) and pH=1.5-2. The residue may contain some undissolved Al and Ti: a probable second leach in the system could be conducted to extract the reminder Al and Ti.

Therefore, in some arrangements, a secondary recycling stream 216 may be extracted including residues of Al, Ti, Ca and rare earths (REs) from insoluble oxalates remaining in the leach solution. A portion of the leach solution including aluminum and titanium may therefore be harvested. The resulting leachate includes ferric oxalate and dissolved Al and Ti, shown at step 218.

In a second stage at step 220, ferric oxalate present in the leachate is selectively precipitated as insoluble ferrous oxalate utilizing Fe powder 222. The iron powder 222 is added to the leach solution to combine with the ferric oxalate to form ferrous oxalate. The precipitate contains ferrous oxalate and unutilized Fe powder. Al and Ti remain unprecipitated in the pregnant leach solution 224. In an example configuration, the precipitation conditions were: Temperature=50° C., pH=4.5-5, time=4 h, Fe/Ferric ion ratio=3:1. The result was substantially pure ferrous oxalate 226 without any tramp aluminum or titanium.

Magnetic classification is conducted on the residue containing ferrous oxalate and unutilized iron powder, as shown at step 228. Magnetic separation is conducted using a suitable magnetic field, and the ferrous oxalate 226 is separated in the non-magnetic fraction. The iron separated as the magnetic part can be reutilized 230 in the precipitation process 220.

Substantially pure ferrous oxalate is employed in magnetite production. Heating the precipitated ferrous oxalate in $pO^2$ is performed at step 232 for generating magnetite 250. In an example configuration, this includes heating in the range of 500-1300° C. In the disclosed example, the separated ferrous oxalate is heated in an $N^2$ atmosphere (low $pO_2$) in a vertical tube furnace. Magnetic nano particulates with high purity are obtained, exhibiting >99% pure magnetite.

Figure 3:
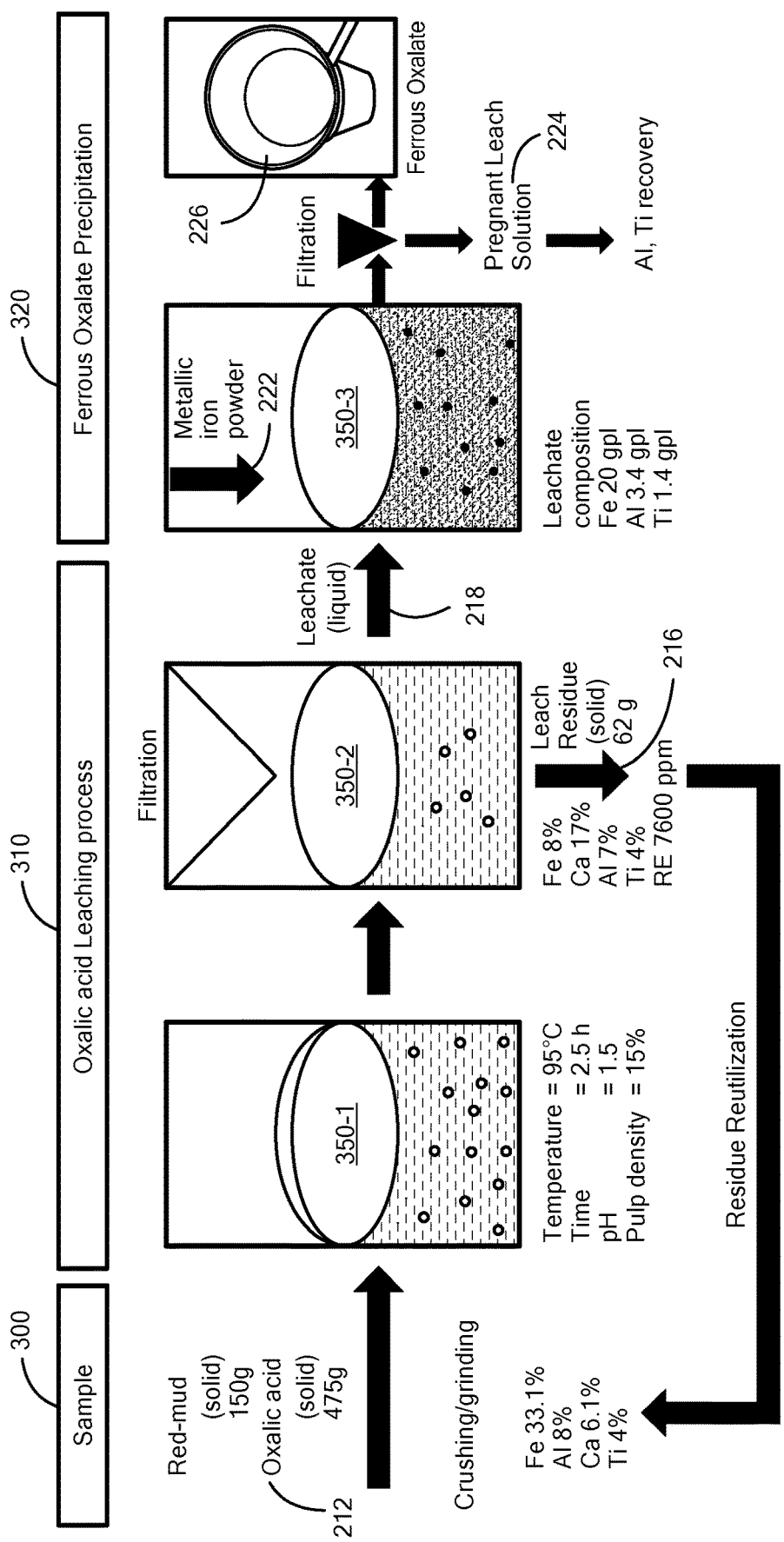
FIG. 3 shows an example processing of red mud into ferrous oxalate for magnetite production according to the flowchart of FIG. 2.

FIG. 3 shows an example processing of red mud into ferrous oxalate for magnetite production according to the flowchart of FIG. 2. Referring to FIGS. 2 and 3, at step 300, raw red mud is gathered as a byproduct form aluminum refining. The oxalic acid leaching process 310 commences with addition of oxalic acid with the red mud to form a leach solution 350-1 at the disclosed parameters for time, temperature, pH and pulp density. After 2.5 hours leaching, filtration occurs with the leach solution 350-2, yielding leachate 218 and leach residue 216, including iron 8%, calcium 17%, aluminum 7%, titanium 4% and other rare earths at 7600 ppm.

The leachate 218 includes the ferrous oxalate 226, to which the iron powder 222 is added for ferrous oxalate precipitation step 320, as solution 350-3. Following filtering of the ferrous oxalate 226, Al and Ti may be recovered from the remaining pregnant leach solution 224.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for extracting ferrous oxalate from red mud, comprising:

grinding raw red mud to a particulate size of $P_{80}$ of 75 microns;

adding a leach agent consisting of oxalic acid to the ground, raw red mud to form a leach solution;

monitoring and controlling the pH of the leach solution to maintain the pH in a range between 1.5-3.0 to form ferric oxalate in the leach solution;

adding iron powder to the leach solution for combining with the ferric oxalate in the leach solution;

precipitating ferrous oxalate from the leach solution;

extracting a secondary recycling stream including Al and Ti from insoluble oxalates remaining in the leach solution following precipitation of the ferrous oxalate from the leach solution; and separating the iron powder from the ferrous oxalate via magnetic separation, the iron powder returned to continue precipitation of ferrous oxalate.

2. The method of claim 1 further comprising maintaining the temperature of the leach solution between 80-100° C. during leaching of the ferric oxalate and maintaining the temperature at least at 50° C. during precipitation of the ferrous oxalate.

3. The method of claim 1 wherein the raw red mud is a hydrated slurry resulting from a waste stream in aluminum refinement.

4. The method of claim 1 further comprising monitoring and controlling the pH of the leach solution to a range between 2.0-2.5 for leaching ferric oxalate.

5. The method of claim 1 further comprising maintaining the temperature of the leach solution between 90-95° C. during leaching of the ferric oxalate.

6. The method of claim 1 further comprising heating the precipitated ferrous oxalate in a low $pO_2$ environment for generating magnetite.

7. The method of claim 6 further comprising heating in the range of 500-1300° C.

8. The method of claim 1 wherein maintaining the pH during oxalic acid leaching until precipitation of the ferrous oxalate results in formation of insoluble ferrous oxalate from soluble ferric oxalate in the leach solution.

9. The method of claim 1 further comprising receiving the raw red mud as a byproduct form aluminum refining.

10. The method of claim 9 further comprising co-locating a containment apparatus for the red mud and precipitated ferrous oxalate with an aluminum refining operation for receiving the raw red mud from the co-located aluminum refinement.

11. The method of claim 1 further comprising performing precipitation in ambient visible light and an absence of UV lighting.

12. The method of claim 1 further comprising heating the precipitated ferrous oxalate in a reduced partial pressure $pO_2$ environment for generating at least 99% pure magnetite.

13. The method of claim 12 further comprising heating the precipitated ferrous oxalate in an $N_2$, low $pO_2$ atmosphere in a vertical tube furnace.

14. A method for extracting ferrous oxalate from red mud, comprising:

grinding raw red mud to a particulate size of P80 of 75 microns;

adding a leach agent consisting of oxalic acid to a hydrated slurry of the around red mud to form a leach solution, the red mud resulting from a waste stream in aluminum refinement;

monitoring and controlling the pH of the leach solution to maintain the pH of the leach solution in a range between 1.5-3.0 to form ferric oxalate in the leach solution;

maintaining the temperature of the leach solution between 80-100° C. during leaching of the ferric oxalate;

adding iron powder to the leach solution for combining with ferric oxalate in the leach solution;

precipitating and filtering ferrous oxalate from the leach solution;

extracting a secondary recycling stream including Al and Ti from insoluble oxalates remaining in the leach solution following precipitation of the ferrous oxalate from the leach solution; and separating the iron powder from the ferrous oxalate via magnetic separation, the iron powder returned to continue precipitation of ferrous oxalate.

* * * * *

UNITED STATES PATENT AND TRADEMARK OFFICE
CERTIFICATE OF CORRECTION

| | | |
|---|---|---|
| PATENT NO. | : 10,836,649 B2 | Page 1 of 1 |
| APPLICATION NO. | : 16/213243 | |
| DATED | : November 17, 2020 | |
| INVENTOR(S) | : Sumedh Gostu and Brajendra Mishra | |

It is certified that error appears in the above-identified patent and that said Letters Patent is hereby corrected as shown below:

Column 6, Claim 14, Line 17, delete "around" and insert --ground--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*